July 12, 1960 W. E. SCHULZ ET AL 2,944,261
METHOD OF DRIVING STUDS INTO BODIES BY HIGH PRESSURE GASES
Filed May 4, 1955 2 Sheets-Sheet 1
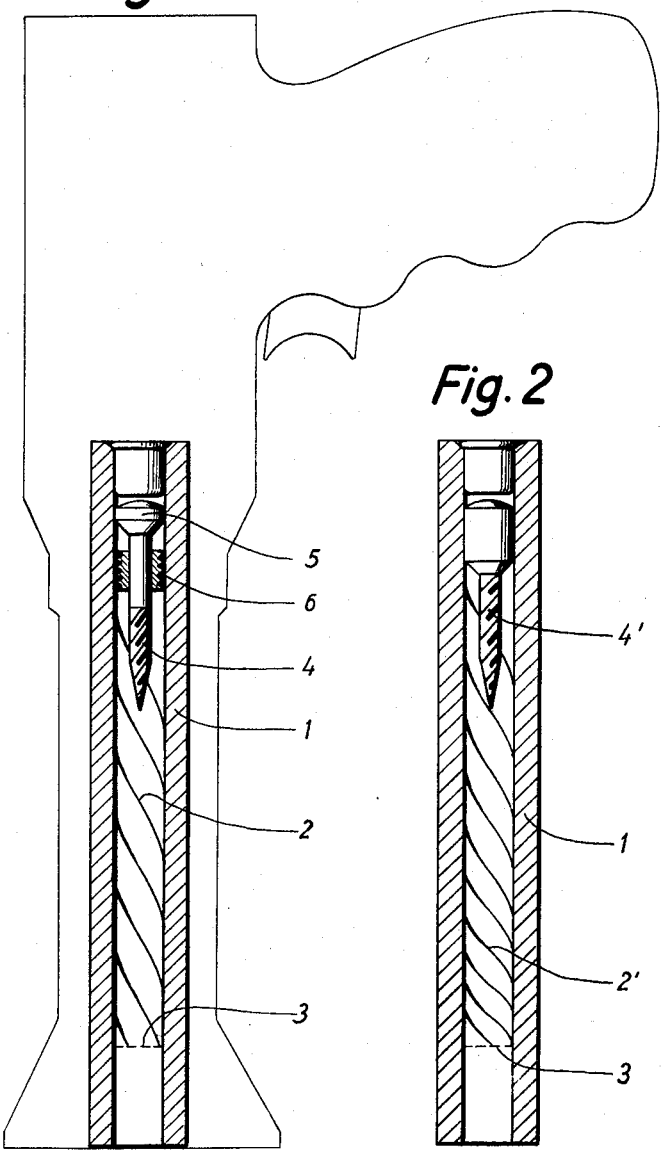
INVENTORS:
Walter E. Schulz
and
Georg Seitz
By
Patent Agent

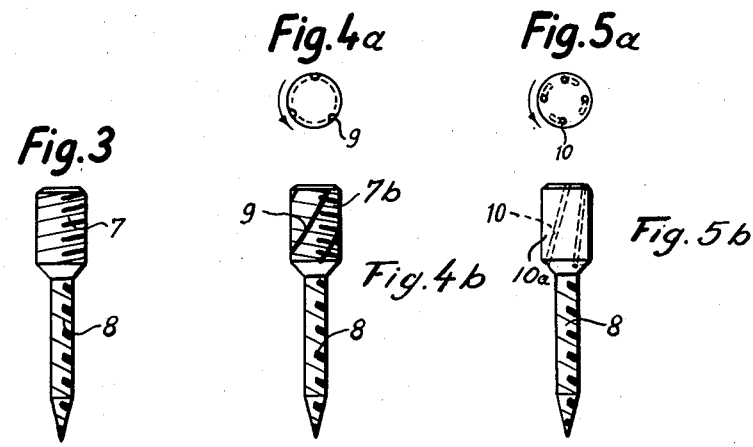
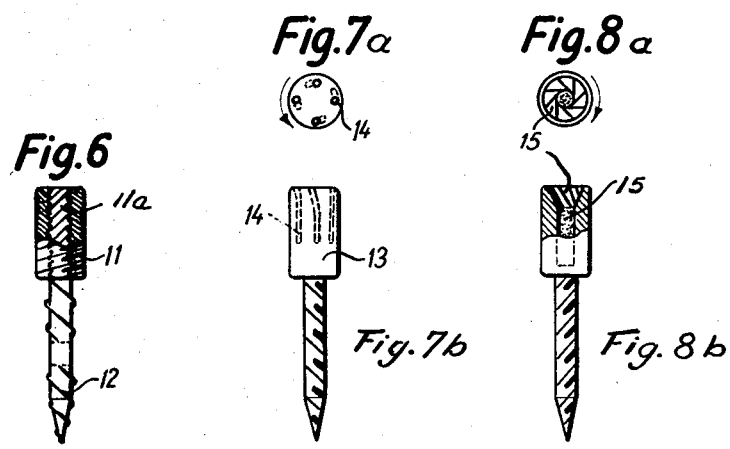

United States Patent Office 2,944,261
Patented July 12, 1960

2,944,261

METHOD OF DRIVING STUDS INTO BODIES BY HIGH PRESSURE GASES

Walter E. Schulz, Wulfrath, Rhineland, and Georg I. Seitz, Braunschweig, Germany; said Seitz assignor to said Schulz Filed May 4, 1955, Ser. No. 505,994

Claims priority, application Germany July 8, 1954

3 Claims. (Cl. 1—60)

In connection with the driving of studs into bodies such as walls, concrete ceilings, steel beams, wooden structures, etc., so-called stud driving tools are employed.

With such driving tools, the studs are driven into the respective body by means of the force created by gases under high pressure as, for instance, powder gases. It has been found that in some instances the studs which generally have a smooth surface and a round cross-section do not sufficiently adhere in the respective body and can relatively easily be withdrawn therefrom. Therefore, numerous attempts have been made to impart upon the stud a tighter fit. Thus, for instance, it has been suggested to provide the stud with grooves extending parallel to the axis of the stud or extending in the manner of a thread. It has also been suggested to employ studs into which a deep sharp edged thread of high pitch has been cut. According to still another similar suggestion, the stud was given a star-shaped cross-section, and the ribs or fins thus created were given a slightly spiral shape. All these suggestions were based on the assumption that the stud would screw itself into the body into which it would be driven, and that in this way a tighter fit of the stud in said body would result. However, the actual results were unsatisfactory.

It is, therefore, an object of the present invention to provide a stud and a method of driving such studs into bodies, which will overcome the above-mentioned drawbacks.

It is still another object of this invention to provide a stud which, when driven into bodies by high pressure gases, will extremely tightly fit and firmly adhere to the respective body.

It is still another object of this invention to provide a method of driving a stud into a body by gas pressure derived from the combustion of a propellent powder so that said stud will firmly adhere to the respective body.

These and other objects and advantages of the invention will appear more clearly from the following specification in connection with the accompanying drawings, in which:

Fig. 1 illustrates in thin lines the outline of a driving tool which is provided with a barrel according to the invention, said barrel being shown in section in heavy lines.

Fig. 2 represents a longitudinal section through a modified barrel according to the invention.

Figs. 3 to 8 illustrate various embodiments of a stud according to the invention.

*General arrangement*

According to the present invention, the stud when being driven into a body such as a wall, ceiling or the like has imparted thereon a rotative movement. The invention is based on the finding that even if the stud itself is provided with a thread, it is by no means sure that the stud when penetrating the body will rotate in conformity with the pitch of the thread in order to screw itself into the respective body. Tests have proved that the stud provided with a thread first penetrates the respective body without rotation and only in particularly favorable instances slightly turns during the penetrating operation. As a result thereof, the thread of the stud, so to speak, files out the hole produced by the stud when the latter enters the body so that at least in the outer portions of the hole the stud adheres poorly to the body. When the thread is so emphasized that the stud has to turn when entering the body, the stud will have the tendency to rotate at an increased speed when entering said body. The stud head which represents the main mass of the stud opposes this rotative movement by its inertia so that, as tests have proved, a twisting of the stud occurs. If, on the other hand, prior to entering the body, the stud is caused to rotate in the direction of the thread, the stud will screw itself into the body from the very start and that part of the stud which has entered the respective body will firmly adhere to the respective body along the entire length of penetration of the body by said stud.

According to another suggestion, the stud may be rotated by the action of the gas stream of the gases developed during the firing operation. To this end, the head of the stud may be provided with inclined passages or grooves through which the propelling gas can pass. The rotation of the stud will then be created in the manner known in connection with turbines. To a certain exent, this turbine effect may also be obtained by providing the stud head with a thread, the direction of which must be opposite to the direction of the thread on the shank of the stud by means of which thread the stud screws itself into the body into which the stud is to be driven.

*Structural arrangement*

Referring now to the drawings in detail and Fig. 1 thereof in particular, this figure illustrates a rifled barrel 1 with grooves of a steep right-hand thread. The grooves 2 end at 3, and from here to the muzzle, the bore of the barrel is smooth. Expediently, the grooves or rifling are stopped short of the muzzle by a distance which approximately equals the length of the stud portion to be driven into the respective body. This has the advantage that the stud from the very instant when it starts entering the body, i.e., from the very instant when its velocity again decreases, is not positively guided any longer in the rifling grooves so that the rotative movement and the penetrating velocity of the pitch of the thread can adjust themselves relative to each other. If the rifling grooves would extend up to the muzzle, there would exist the danger that during the penetration of the body by the stud, the stud would rotate somewhat faster or slower than reduced by the pitch of its thread, even when the pitch of the rifling grooves and the pitch of the thread of the stud were carefully adapted to each other. As a result thereof, the thread cut by the stud into the body into which it is being driven would be rather rough so that the stud would insufficiently adhere to or stick in said body.

The front portion or shank of the stud represents the portion intended to be driven into a body. This portion is likewise provided with a steep right-hand thread 4. The head 5 of the stud shown in Fig. 1 is not provided with a thread and is of such dimensions that its outermost circumferential section will closely engage the barrel wall, and by means of its edge portion will press itself into the rifling grooves 2. To this end, the edge portion of the head may, if desired, be provided with a layer of softer material. For purposes of guiding the stud in the barrel 1, the shank of the stud is provided with a guiding member 6 of synthetic material or the like. If desired, the stud may also be guided in the rifling grooves by placing a guiding head of softer material upon the head of the stud, provided, of course, that the stud head will be so designed as to allow placing of the stud in the barrel with such guiding head mounted on the stud head. Such guiding head may be slipped or screwed upon the head of the stud in a manner somewhat similar to that shown in Fig. 6. The guiding head will press itself into the rifling grooves. After the stud has been driven into the respective body, the said guiding head may be removed from the head proper of the stud.

The barrel shown in Fig. 2 differs from that of Fig. 1 merely in that the pitch of the rifling grooves is not uniform but decreases toward the muzzle. The effect of such decreasing pitch consists in that the stud, while being pressed through the barrel, will obtain an ever in-increasing circumferential velocity. Accordingly, the thread 4' on the stud may be flatter than with the embodiment of Fig. 1 so that it will create a higher resistance against any attempt to withdraw the stud from the material into which it has been driven.

Fig. 3 illustrates a stud which, according to the method of the present invention, may be fired from a barrel with a smooth inner surface. The enlarged part or head 7 of the stud is provided with a normal right-hand thread which makes it possible to screw a nut upon the stud subsequent to the driving of the stud into the respective body. In this instance, however, the front portion 8 of the stud must be provided with a left-hand thread.

In this connection, it should be noted that the thread which produces the rotation of the stud in the barrel must have a direction opposite to the direction of the thread by means of which the stud screws itself into the body into which the stud is to be driven. This fact is based on the finding that the powder gases follow the path of the thread which produces the rotation of the stud in the barrel and at the end of this thread leave the same and pass in the direction of the last thread winding into the space head thereof. This means that the gases leave this thread in tangential direction, whereby a turbine effect is produced which imparts upon the stud in the barrel a rotation of said last mentioned thread. In other words, when the head of the stud is provided with right-hand thread, the stud will in this instance turn in left-hand direction in the barrel.

If the thread on the stud head is not suitable for producing the said turbine effect, inclined grooves which might intersect the respective thread will produce the rotation of the stud.

Figs. 4a and 4b show a top view and side view of a stud which differs from that of Fig. 3 in that for purposes of producing a turbine effect, grooves 9 in form of a steep spiral have been milled into the stud head which intersect the thread 7b. Expediently, these grooves intersect the thread at a steep, preferably right angle. To this end, the thread of the head and the grooves may be selected so that they extend in opposite direction, the thread of the stem should be opposite to that of the grooves. In other words, if a left-hand thread is selected for the stem, the grooves should be right-hand grooves. Such milled grooves will produce the said turbine effect, also when the thread 7b is omitted, if the stud head has a smooth outer surface similar to the stud head 10a of Figs. 5a and 5b.

According to Figs. 5a and 5b showing a top view and a side view of a modified stud, the screw shaped grooves 9 of Figs. 4a and 4b have been replaced by bores 10 which are inclined with regard to the axis of the stud. The powder gases will then pass through said bores 10 so that they leave the front portion of the head in a direction more or less wind-tipped with regard to the axis of the stud, thereby producing the above-mentioned turbine effect. If studs are to fired which have no heads (see Fig. 6) or in which grooves or bores are not desired in the heads, the rear end of the stud may be provided with a thread adapted to receive a head with grooves or bores as illustrated in Figs. 4a, 4b, and 5a, 5b. Subsequent to the driving of the stud into the respective body, the screwed on heads may again be removed. The employment of such heads adapted to be placed upon the stud has the further advantage that studs of different diameter can be fired from the same barrel. Moreover, such studs which have a short head only will be properly guided by said auxiliary heads placed thereupon.

Fig. 6 shows a stud having a threaded head 11 which happens to be threaded on to the threaded portion 11a, but may also be designed according to Figs. 3 to 4b.

If a stud having an outer thread on its head is fired from a rifled barrel, it may be expedient to surround the thread on shank 12 by a sleeve of synthetic material or the like in order to eliminate the turbine effect which counter-acts the rotation of the stud when head and stem have threads of the same direction. In this way a tight seal is obtained between the stud and the barrel. The shank 12 is provided with a multiple thread which extends beyond the conical portion up to the outermost tip of the stud. In certain instances, it may be advantageous as illustrated to interrupt the thread in the center portion of the stem, or to interrupt the thread at several points, particularly when the stud is to be driven into softer material such as wood.

According to still another embodiment of the invention, the stud may be designed as a rocket stud by not placing the propellent charge into a cartridge to be placed behind the stud in the barrel, but by placing the propellent charge in the stud itself. Such rocket stud has the advantage that a recoil can be completely avoided during the firing of the stud. The combustion chamber receiving the propellent charge may be detachably connected to the stud or may form a part of the stud. If the combustion chamber is so designed that the propellent gases leave one or more nozzles in a wind tipped direction with regard to the stud axis, the stud will simultaneously be rotated so that it will screw itself into the material of the respective body into which it is driven. The firing can be effected by a standard cartridge which merely serves the purpose of initiating the movement of the stud and of igniting the charge in the combustion chamber. The ignition, however, may also be effected directly by causing the tip of the firing pin to hit the bottom of the stud in which a detonator is provided whereby the propellent charge is ignited. Instead of producing the ignition by means of a firing pin, an electric ignition could be employed. The thread provided on the front portion of the stud and intended to screw the stud into the respective body is preferably a multiple thread, i.e., a thread, the pitch of which is considerably higher than the pitch of a normal screw thread. Such multiple thread might have a pitch up to 45 and more degrees. Expediently, a multiple thread of coarse pitch is employed. In order to take advantage of the screwing-in effect from the very start of the penetration of the stud into the body, the thread may be so designed that it extends beyond the conical portion of the stud tip in a manner similar to that customary with wood screws and wood drills.

Referring now specifically to Figs. 7a and 7b showing a stud with rocket drive, it will be noted that the head 13 of the stud is provided with a plurality of bores 14 which are inclined at the face of the head remote from the shank. These bores are filled with fuel. When firing the stud, the fuel charge burns in the bores, and a jet leaves the nozzle-like openings so that a rocket effect is obtained which drives the stud forwardly and at the same time rotates the same.

A rocket stud may also be designed in conformity with the showing of Figs. 8a and 8b. According to the embodiment shown in these figures, the head is provided with a chamber 15 receiving the propellent charge. The gas jets leave said chamber 15 through one or more passages.

With the studs working according to the turbine principle described in connection with Figs. 3 to 5, and also with rocket studs, the dimensioning of the cross-sections of the channels or grooves and the angle of inclination of the exit passages may be selected in conformity with the desired frequency of rotation of the stud.

Tests carried out with studs of the present invention have shown the surprising result that the studs will adhere to the respective body to such an extent that they cannot be withdrawn any more and will tear off when an attempt is made to withdraw the same. Such a favorable result has never before been obtained because the adhesive force of the studs in the respective bodies was always considerably less than the tensile strength of the respective studs. The tests carried out in conformity with the present invention have furthermore proved that studs driven into a body penetrate the material of such body always in straight direction.

It is, of course, understood that the present invention is, by no means, limited to the particular constructions shown in the drawings but also comprises any modifications within the scope of the appended claims.

What we claim is:

1. A method of driving a stud having a shank with a high pitch thread into a body by means of gases under pressure, which includes the steps of: applying the force of gases under pressure to impart to said stud a relatively high velocity in an axial direction, and simultaneously imparting to said stud a rotation about its longitudinal axis in the same sense as that of the high pitch thread on said shank, thereby causing said shank to carry out a rotary movement of relatively high speed about its axis prior to said stud hitting said body.

2. A method of driving a stud having a shank with a high pitch thread into a body by means of gases under pressure, which includes the steps of: accelerating said stud in axial direction thereof so as to advance the same at a relatively high speed and simultaneously therewith accelerating said stud in rotary direction about its longitudinal axis so as to cause said stud to rotate at a relatively high speed prior to said stud hitting said body, thereby causing said stud when hitting said body to screw itself into said body.

3. The method of driving a stud having a shank with a high pitch helical rib into a body comprising the steps of producing gases under pressure, applying the force of said gases to project said stud along its longitudinal axis toward said body, imparting spin to said stud about said longitudinal axis in the same sense as that of said helical rib during the initial portion of its travel before striking said body, and ceasing to impart spin to said stud and continuing the application of the longitudinal force in the latter portion of its travel, the angular momentum of said stud causing rotary movement of said stud to continue as said stud penetrates said body.

References Cited in the file of this patent

UNITED STATES PATENTS

| | | |
|---|---|---|
| 300,515 | Schneider | June 17, 1884 |
| 315,746 | De Arguibel | Apr. 14, 1885 |
| 375,907 | Whitmore | Jan. 3, 1888 |
| 460,102 | Carver | Sept. 22, 1891 |
| 463,922 | Russell | Nov. 24, 1891 |
| 511,418 | Gathmann | Dec. 26, 1893 |
| 579,035 | Bell | Mar. 16, 1897 |
| 871,825 | Schupmann | Nov. 26, 1907 |
| 1,275,028 | Holter | Aug. 6, 1918 |
| 1,365,869 | Temple | Jan. 18, 1921 |
| 2,575,079 | Temple | Nov. 13, 1951 |
| 2,637,241 | Webber | May 5, 1953 |
| 2,666,252 | Temple | Jan. 19, 1954 |
| 2,669,716 | Catlin | Feb. 23, 1954 |
| 2,676,508 | Erickson | Apr. 27, 1954 |
| 2,722,003 | Erickson | Nov. 1, 1955 |
| 2,722,004 | Webber | Nov. 1, 1955 |

FOREIGN PATENTS

| | | |
|---|---|---|
| 29,526 | Norway | Mar. 3, 1919 |
| 589,598 | France | Feb. 25, 1925 |
| 509,655 | Belgium | Mar. 31, 1952 |
| 472,022 | Italy | June 4, 1952 |
| 506,755 | Belgium | Mar. 13, 1953 |
| 1,055,269 | France | Oct. 14, 1953 |
| 729,824 | Great Britain | May 11, 1955 |